US012263584B2

(12) United States Patent
Miyazaki

(10) Patent No.: US 12,263,584 B2
(45) Date of Patent: Apr. 1, 2025

(54) ROBOT

(71) Applicant: FANUC CORPORATION, Yamanashi (JP)

(72) Inventor: Takuya Miyazaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/036,840

(22) PCT Filed: Nov. 26, 2021

(86) PCT No.: PCT/JP2021/043309
§ 371 (c)(1),
(2) Date: May 12, 2023

(87) PCT Pub. No.: WO2022/114093
PCT Pub. Date: Jun. 2, 2022

(65) Prior Publication Data
US 2023/0405847 A1 Dec. 21, 2023

(30) Foreign Application Priority Data
Nov. 30, 2020 (JP) .................................. 2020-198401

(51) Int. Cl.
B25J 19/00 (2006.01)
(52) U.S. Cl.
CPC ................................. B25J 19/0062 (2013.01)
(58) Field of Classification Search
CPC .................................................... B25J 19/0062
See application file for complete search history.

(56) References Cited

U.S. PATENT DOCUMENTS 3,042,462 A * 7/1962 Rosskopf ............ F16C 33/6659
384/466
4,040,312 A * 8/1977 Tappan ................... F16H 47/04
475/342

(Continued)

FOREIGN PATENT DOCUMENTS

JP S6229291 U 2/1987
JP 2005177914 A 7/2005

(Continued)

OTHER PUBLICATIONS

International Search Report dated Feb. 1, 2022, for International Patent Application No. PCT/JP2021/043309.

Primary Examiner — Michael A Riegelman
(74) Attorney, Agent, or Firm — KARCESKI IP LAW, PLLC

(57) ABSTRACT

A robot includes a lubricant chamber in which a fluid lubricant can be stored, wherein the lubricant chamber is provided with three or more through-holes that extend through wall surfaces of the lubricant chamber, and the through-holes are disposed such that, in a state in which any one of the through-holes is disposed at a lowest level of the lubricant chamber so as to allow a utilization thereof as an oil discharge hole in two or more orientations of the lubricant chamber, another one of the through-holes is disposed at a position corresponding to a liquid level of the lubricant when a required amount of the lubricant is stored in the lubricant chamber or above the liquid level so as to allow a utilization thereof as a vent hole, and a remaining through-hole is disposed at a position that allows a utilization thereof as an oil supply hole from which the lubricant is supplied into the lubricant chamber.

6 Claims, 9 Drawing Sheets

(56) References Cited

U.S. PATENT DOCUMENTS

| | | | | |
|---|---|---|---|---|
| 5,192,139 A * | 3/1993 | Hiramoto | F16C 19/525 | 409/135 |
| 5,212,432 A * | 5/1993 | Ohtani | B25J 19/0029 | 901/49 |
| 5,259,194 A * | 11/1993 | Okada | F16H 57/027 | 475/83 |
| 5,667,314 A * | 9/1997 | Limanowka | F16C 41/02 | 384/619 |
| 10,480,695 B2 * | 11/2019 | Kurebayashi | F16L 23/16 | |
| 11,148,280 B2 * | 10/2021 | Kume | F16H 57/0486 | |
| 11,359,712 B2 * | 6/2022 | Kimura | F16H 57/0436 | |
| 11,945,108 B2 * | 4/2024 | Eisenwinter | F16H 57/0402 | |
| 2008/0258402 A1 * | 10/2008 | Tamura | B25J 19/0075 | 414/787 |
| 2010/0032242 A1 * | 2/2010 | Lin | F01M 13/00 | 184/6.12 |
| 2015/0226266 A1 * | 8/2015 | Mori | B23Q 11/123 | 384/467 |
| 2016/0377123 A1 * | 12/2016 | Yoshino | F16C 33/6662 | 384/476 |
| 2017/0312924 A1 * | 11/2017 | Kinoshita | B25J 15/0009 | |
| 2018/0058615 A1 * | 3/2018 | Kurebayashi | F16L 23/003 | |
| 2019/0054614 A1 * | 2/2019 | Ohtsubo | B25J 19/0062 | |
| 2019/0264795 A1 * | 8/2019 | Nakayama | F16N 31/02 | |
| 2020/0238503 A1 * | 7/2020 | Kume | F16H 57/029 | |
| 2020/0238544 A1 * | 7/2020 | Shiramatsu | B25J 9/102 | |
| 2020/0370636 A1 * | 11/2020 | Kimura | F16K 15/026 | |
| 2022/0250235 A1 * | 8/2022 | Eisenwinter | B25J 19/0062 | |
| 2023/0356419 A1 * | 11/2023 | Yamamoto | B25J 19/0062 | |
| 2023/0405847 A1 * | 12/2023 | Miyazaki | B25J 19/0062 | |
| 2024/0151351 A1 * | 5/2024 | Hasuo | F16C 33/6685 | |

FOREIGN PATENT DOCUMENTS

| | | |
|---|---|---|
| JP | 2018034268 A | 3/2018 |
| JP | 2019034383 A | 3/2019 |
| JP | 2020116716 A | 8/2020 |
| JP | 2020121350 A | 8/2020 |
| JP | 2020190317 A | 11/2020 |

* cited by examiner

ROBOT

CROSS-REFERENCE TO RELATED APPLICATION(S)

This is a National Stage Entry into the United States Patent and Trademark Office from International Patent Application No. PCT/JP2021/043309, filed on Nov. 26, 2021, which relies on and claims priority to Japanese Patent Application No. 2020-198401, filed on Nov. 30, 2020, the entire contents of both of which are incorporated herein by reference.

FIELD OF THE INVENTION

The present disclosure relates to a robot.

BACKGROUND OF THE INVENTION

There is a known robot having a decelerator including: a lubricant chamber in which a lubricant for lubricating a gear mechanism is stored; and an oil injection port and oil discharge ports that are provided in the lubricant chamber and through which the lubricant is injected and discharged (for example, see Japanese Unexamined Patent Application, Publication No. 2019-34383).

The robot of Japanese Unexamined Patent Application, Publication No. 2019-34383 is provided with an end-surface oil discharge port through which, when the lubricant is replaced in the state in which the robot is installed on a floor surface, old lubricant in the lubricant chamber is discharged and a side-surface oil discharge port through which new lubricant injected into the lubricant chamber is discharged in an amount exceeding a prescribed amount.

SUMMARY OF THE INVENTION

An aspect of the present disclosure is a robot including a lubricant chamber in which a fluid lubricant can be stored, wherein the lubricant chamber is provided with three or more through-holes that extend through wall surfaces of the lubricant chamber, and the through-holes are disposed such that, in a state in which any one of the through-holes is disposed at a lowest level of the lubricant chamber so as to allow a utilization thereof as an oil discharge hole in two or more orientations of the lubricant chamber, another one of the through-holes is disposed at a position corresponding to a liquid level of the lubricant when a required amount of the lubricant is stored in the lubricant chamber or above the liquid level so as to allow a utilization thereof as a vent hole, and a remaining one of the through-holes is disposed at a position that allows a utilization thereof as an oil supply hole from which the lubricant is supplied into the lubricant chamber.

DESCRIPTION OF EMBODIMENT(S) OF THE INVENTION

A robot 1 according to an embodiment of the present disclosure will be described below with reference to the drawings.

Figure 1:
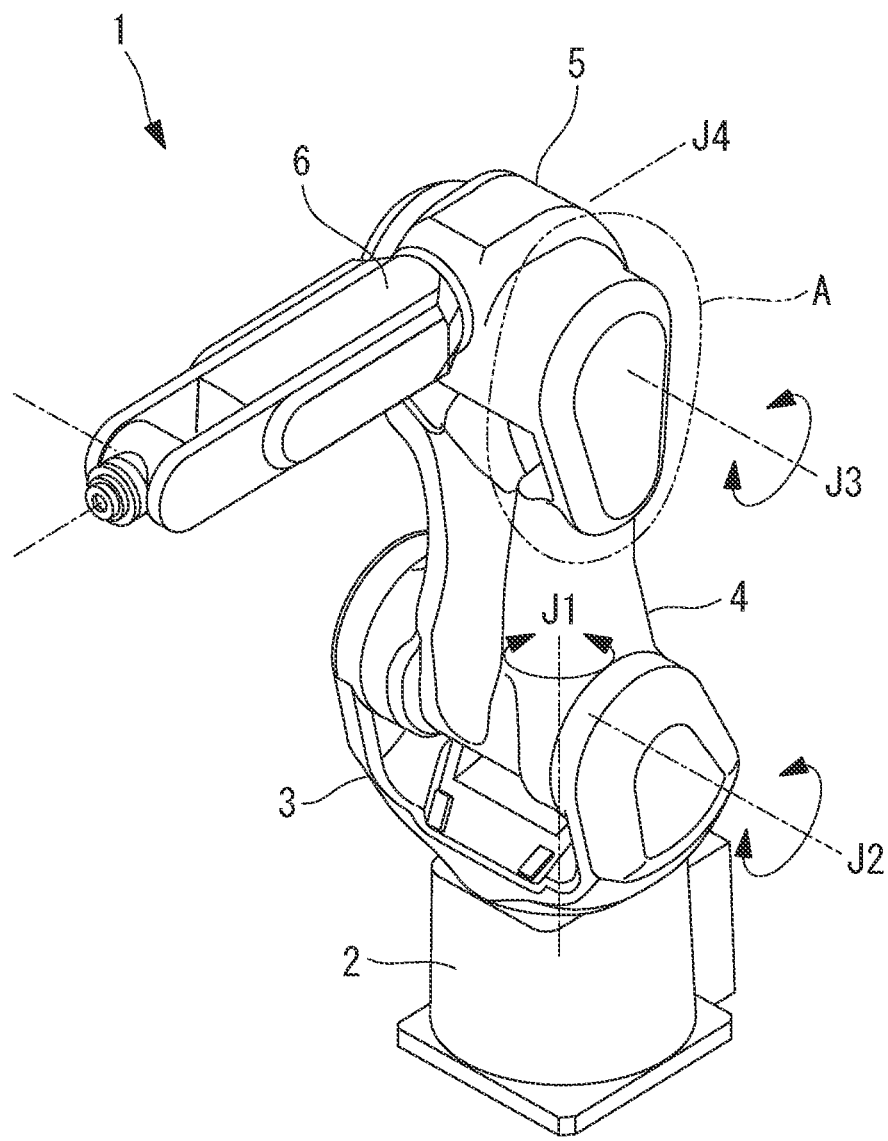
FIG. 1 is an overall configuration diagram showing a robot according to an embodiment of the present disclosure.

The robot 1 according to this embodiment is, for example, as shown in FIG. 1, a vertical articulated robot, and includes a base 2 that is installed on an installation surface and a rotary barrel 3 that is supported with respect to the base 2 so as to be rotatable about a first axis J1 that extends in a direction orthogonal to the installation surface.

In addition, the robot 1 includes: a first arm (first member) 4 that is supported with respect to the rotary barrel 3 so as to be rotatable about a second axis J2 that extends in a direction orthogonal to the first axis J1; and a second arm (second member) 5 that is supported with respect to the first arm 4 so as to be rotatable about a third axis J3 that is parallel to the second axis J2. Furthermore, the robot 1 includes a three-axis wrist unit 6 at a distal end of the second arm 5.

The structure of the joints of the robot 1 according to this embodiment will be described in terms of a joint A between the first arm 4 and the second arm 5 as an example.

Figure 2:
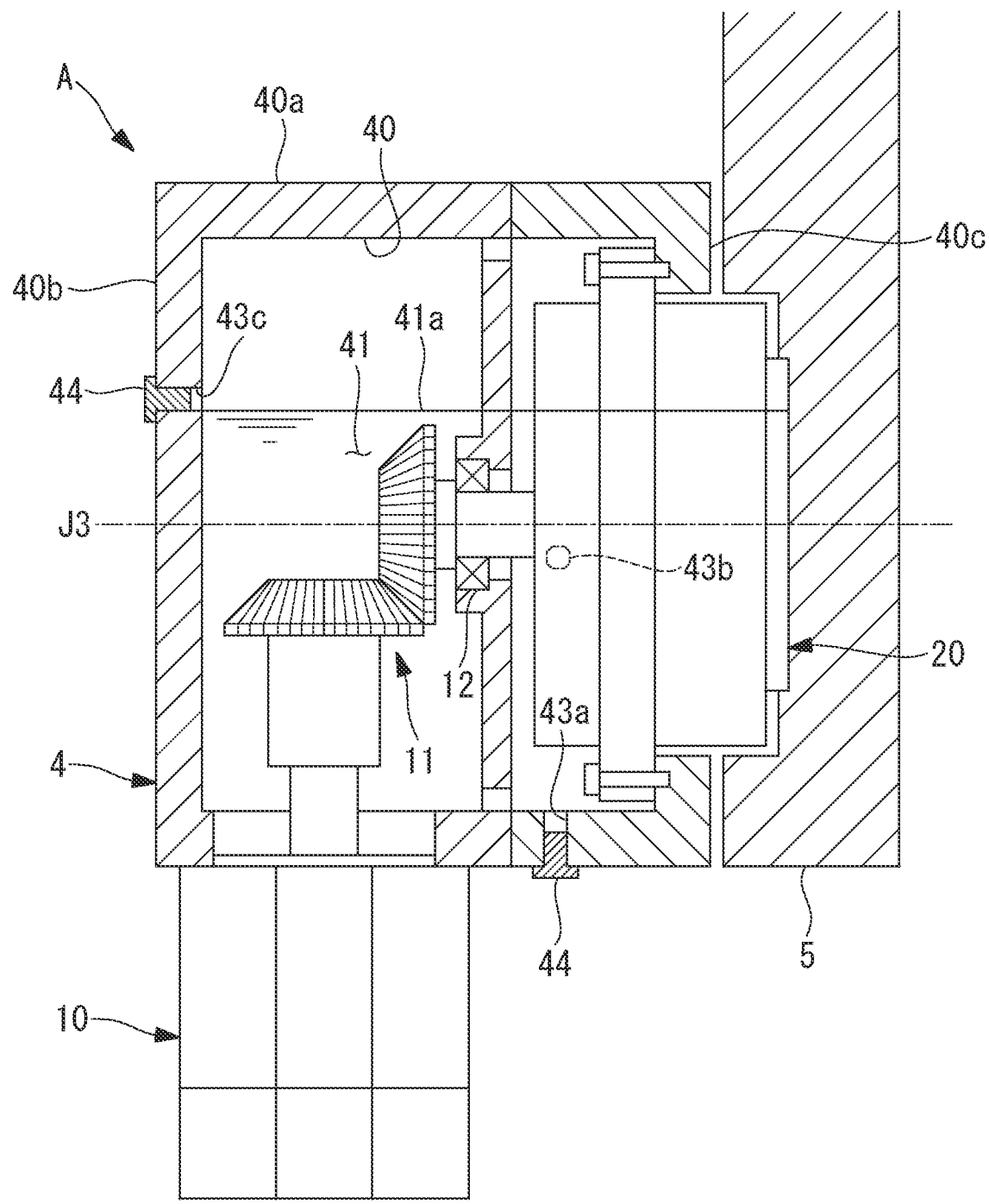
FIG. 2 is a longitudinal sectional view showing an example of an internal structure of a joint disposed between a first arm and a second arm of the robot in FIG. 1.

As shown in FIG. 2, the joint A includes a servomotor 10 that drives the second arm 5 with respect to the first arm 4 and a decelerator 20.

The servomotor 10 is secured to the first arm 4, and the decelerator 20 is secured between the first arm 4 and the second arm 5. The first arm 4 is provided with a lubricant chamber 40. The lubricant chamber 40 stores a fluid lubricant 41, such as an oil, for lubricating gears 11 that transmit a motive power of the servomotor 10, a bearing 12 that supports the gears 11 with respect to the first arm 4 in a rotatable manner, and the decelerator 20.

FIG. 2 shows an example of a longitudinal section in which the lubricant chamber 40 is cut along a cut surface extending in the vertical direction when the robot 1 is in the orientation in FIG. 1. The lubricant chamber 40 is defined by a cylindrical peripheral wall (wall surface) 40a and a pair of end walls (wall surfaces) 40b and 40c that close off the two ends of the peripheral wall 40a in the axial direction.

The lubricant chamber 40 is provided with three through-holes 43a, 43b, and 43c that allow the interior of the lubricant chamber 40 to communicate with an external space.

The through-holes 43a and 43b are both formed so as to extend through the peripheral wall 40a of the lubricant chamber 40 in a radial direction. The through-hole 43a is disposed at the lowest level of the lubricant chamber 40 when the robot 1 is in the orientation in FIG. 1. In addition, the through-hole 43b is disposed at a position that is different from the through-hole 43a in a circumferential direction by a prescribed angle θ (see FIG. 3).

The through-hole 43c is formed so as to extend through the end wall 40b of the lubricant chamber 40 in a thickness direction. The through-hole 43c is disposed at a position that corresponds to a liquid level 41a when a required amount of the lubricant 41 is stored in the lubricant chamber 40.

The required amount refers to an amount that allows sufficient lubrication of the gears 11 in the interior of the lubricant chamber 40, the bearing 12, and the decelerator 20, and is, for example, 70-80% of the volume of the lubricant chamber 40. The remaining 30-20% is filled with air or a gas such as an inert gas. In addition, the position corresponding to the liquid level 41a refers to, as shown in FIG. 2, the position at which the lower edge of the through-hole 43c is aligned with the liquid level 41a of the required amount of the lubricant 41.

Figure 3:
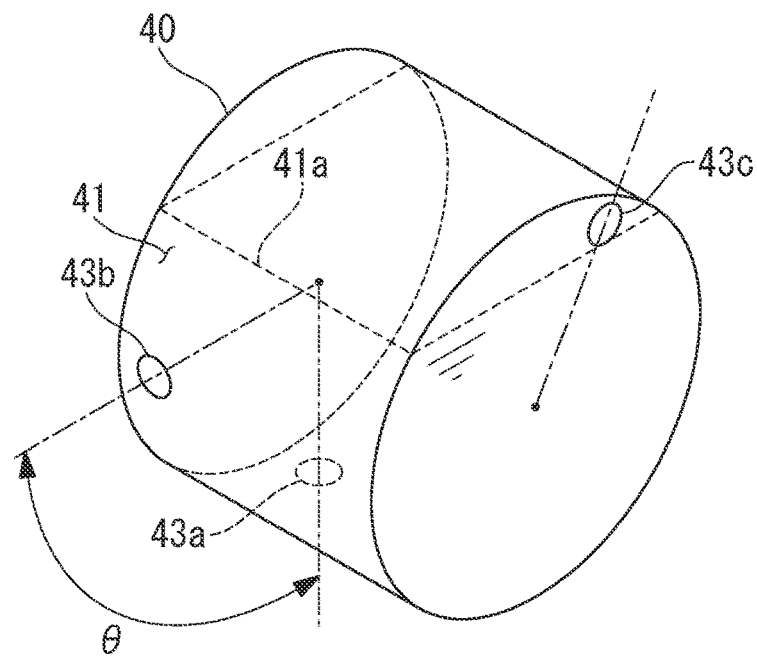
FIG. 3 is a schematic diagram showing the arrangement of individual through-holes provided in a lubricant chamber of the joint in FIG. 2.
Figure 4:
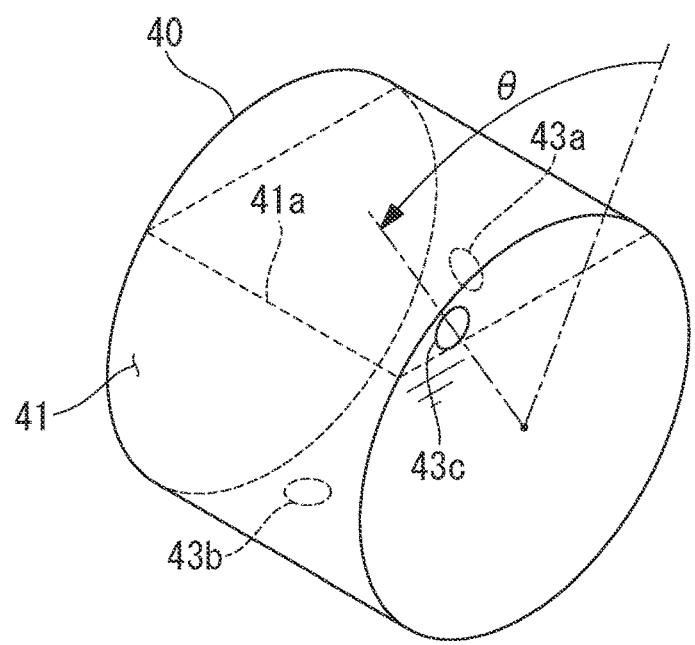
FIG. 4 is a schematic diagram showing the arrangement of the individual through-holes in the case in which the lubricant chamber in FIG. 3 is disposed in a different orientation from the orientation in FIG. 3.
Figure 5:
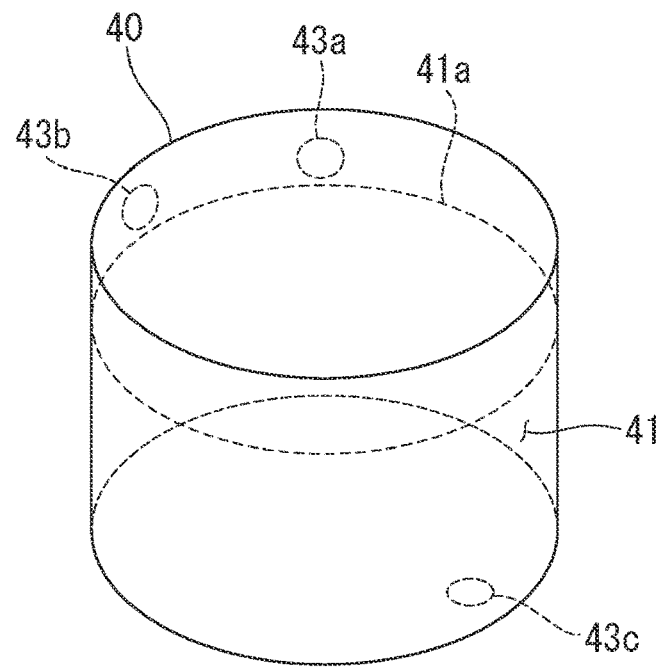
FIG. 5 is a schematic diagram showing the arrangement of the individual through-holes in the case in which the lubricant chamber in FIG. 3 is disposed in a different orientation from the orientations in FIGS. 3 and 4.

Here, in order to simplify the description, the interior space of the lubricant chamber 40 is assumed to have a simple columnar shape, as shown in FIGS. 3-5.

When the robot 1 is in the orientation in FIG. 1, the three through-holes 43a, 43b, and 43c are respectively disposed at the above-described positions, as shown in FIG. 3.

When the robot 1 rotates, from the orientation in FIG. 1, the first arm 4 about the second axis J2 with respect to the rotary barrel 3 by the prescribed angle θ, the orientation of the lubricant chamber 40 changes and the through-hole 43b is moved to the lowest level of the lubricant chamber 40, as shown in FIG. 4. At this time, although the through-hole 43c is also moved by the prescribed angle θ, the through-hole 43c is maintained, after being moved also, at the position corresponding to the liquid level 41a when the required amount of the lubricant 41 is stored in the lubricant chamber 40.

Furthermore, in the case in which the robot 1 is installed on a vertical wall surface and used as a so-called wall-mounted type, the lubricant chamber 40 could be in an orientation in which the through-hole 43c is disposed at the lowest level, as shown in FIG. 5. At this time, at least one of the two through-holes 43a and 43b disposed in the peripheral wall 40a may be disposed at the position corresponding to the liquid level 41a when the required amount of the lubricant 41 is stored in the lubricant chamber 40.

In addition, a female screw (not shown), to which a plug 44 or a nipple provided with an oil-supply check valve (not shown) is fastened in a detachable manner, is formed in each of the through-holes 43a, 43b, and 43c.

Each of the through-holes 43a, 43b, and 43c is closed off by fastening the plug 44 or the nipple thereto, while the atmosphere in the lubricant chamber 40 can be released through each of the through-holes 43a, 43b, and 43c by removing the plug 44 or the nipple.

The work for replacing the lubricant 41 enclosed in the lubricant chamber 40 of the thus-configured robot 1 according to this embodiment will be described.

In order to replace the lubricant 41 in the lubricant chamber 40 provided in the joint A of the robot 1 according to this embodiment, the robot 1 is set in the orientation shown in FIG. 1, and the plug 44 fastened to each of the through-holes 43a and 43c is removed. Because the through-hole 43a is disposed at the lowest level of the lubricant chamber 40, the through-hole 43a serves as an oil discharge hole as a result of removing the plug 44. Because portions of the through-hole 43c other than the lower edge thereof are disposed above the liquid level 41a of the lubricant 41, the through-hole 43c serves as a vent hole for taking external air into the lubricant chamber 40 as a result of removing the plug 44.

Specifically, just by removing the plug 44 from each of the two through-holes 43a and 43c, it is possible to smoothly discharge the old lubricant 41 in the lubricant chamber 40 from the through-hole 43a by means of gravity while taking the external air into the lubricant chamber 40 via the through-hole 43c. Also, it is possible to easily discharge almost all of the lubricant 41 stored in the lubricant chamber 40 from the through-hole 43a positioned at the lowest level of the lubricant chamber 40.

Next, after almost all of the lubricant 41 in the lubricant chamber 40 is discharged, the through-hole 43a, utilized as the oil discharge hole, is closed off by attaching the plug 44 thereto, while keeping the through-hole 43c, utilized as the vent hole, open. In this state, the plug 44 attached to the through-hole 43b is replaced with an oil-supply nipple, and a new lubricant 41 is supplied into the lubricant chamber 40 by connecting an oil supplying device, such as an oil gun, to the replaced nipple.

Once the lubricant chamber 40 starts to be filled with the new lubricant 41, the air filling the lubricant chamber 40 is pushed by the lubricant 41 and discharged to the exterior via the through-hole 43c. Then, once the lubricant chamber 40 is filled with the required amount of the lubricant 41, the liquid level 41a of the lubricant 41 reaches the position of the through-hole 43c and the lubricant 41 starts to slightly overflow from the through-hole 43c. At this point, an operator who is supplying the oil can confirm that the lubricant chamber 40 is filled with the required amount of the lubricant 41.

In addition, even if the lubricant chamber 40 is supplied with the lubricant 41 in an amount that is equal to or greater than the required amount, the excess lubricant 41 is discharged to the exterior from the through-hole 43c. Accordingly, it is possible to fill the lubricant chamber 40 with an appropriate amount of the new lubricant 41.

With the robot 1 according to this embodiment, there is an advantage in that it is possible to perform the work for replacing the lubricant 41, even in the orientation in which the first arm 4 is rotated by the prescribed angle θ from the orientation in FIG. 1.

Specifically, because the lubricant chamber 40 is in the orientation shown in FIG. 4 in this case, it is possible to utilize the through-hole 43b, disposed at the lowest level of the lubricant chamber 40, as the oil discharge hole, to utilize the through-hole 43c as the vent hole, and to utilize the through-hole 43a as the oil supply hole.

Accordingly, it is possible to easily discharge almost the entire amount of the lubricant 41 stored in the lubricant chamber 40 by means of gravity only and to fill the lubricant chamber 40 with an appropriate amount of the new lubricant 41. In other words, with the robot 1 according to this embodiment, it is possible to execute the work for replacing the lubricant 41 in a plurality of different orientations. Therefore, even in the case in which it is difficult to take one orientation for performing the replacement work due to interference between the robot 1 or a tool mounted thereto and a peripheral member or the like, it is possible to smoothly perform the replacement work in another orientation.

In addition, in the case in which the robot 1 installed on a floor surface is used by changing the arrangement thereof to a wall surface installation, the lubricant chamber 40 can be in the orientation shown in FIG. 5, and it is possible to achieve the same effects as those described above by utilizing the through-hole 43c as the oil discharge hole, one of the through-holes 43a and 43b as the vent hole, and the other one of the two through-holes as the oil supply hole.

In other words, it is possible to respectively dispose the oil supply hole, the oil discharge hole, and the vent hole at appropriate positions by changing the roles of the respective through-holes 43a, 43b, and 43c in accordance with changes in the orientation of the lubricant chamber 40 due to changes in the orientation of the arm of the robot 1 or changes in the installation method of the robot 1. Therefore, it is possible to reliably perform sufficient discharge of the lubricant 41 in the lubricant chamber 40 and supply the lubricant chamber 40 with the required amount of the lubricant 41 in a plurality of orientations in which the orientation of the lubricant chamber 40 is changed.

Note that, in this embodiment, the through-hole utilized as the vent hole is disposed, in all cases, at the position corresponding to the liquid level 41a when the required amount of the lubricant 41 is stored. Alternatively, the through-hole utilized as the vent hole may be disposed above the liquid level 41a when the required amount of the lubricant 41 is stored.

In addition, in this embodiment, when the through-hole utilized as the oil discharge hole is disposed at the lowest level of the lubricant chamber 40, the through-hole utilized as the oil supply hole may be disposed above the through-hole utilized as the vent hole.

As a result of disposing the through-holes in this way, the liquid level 41a of the lubricant 41 stored in the lubricant chamber 40 does not exceed the height of the vent hole when supplying the oil; therefore, the liquid level 41a of the lubricant 41 does not reach the height at which the oil supply hole disposed above the vent hole is located.

Accordingly, it is possible to supply the oil without having to mount a nipple provided with a check valve or the like to the oil supply hole in the open state with the plug 44 removed therefrom, and it is possible to enhance the work efficiency of the oil-supplying work.

Figure 6:
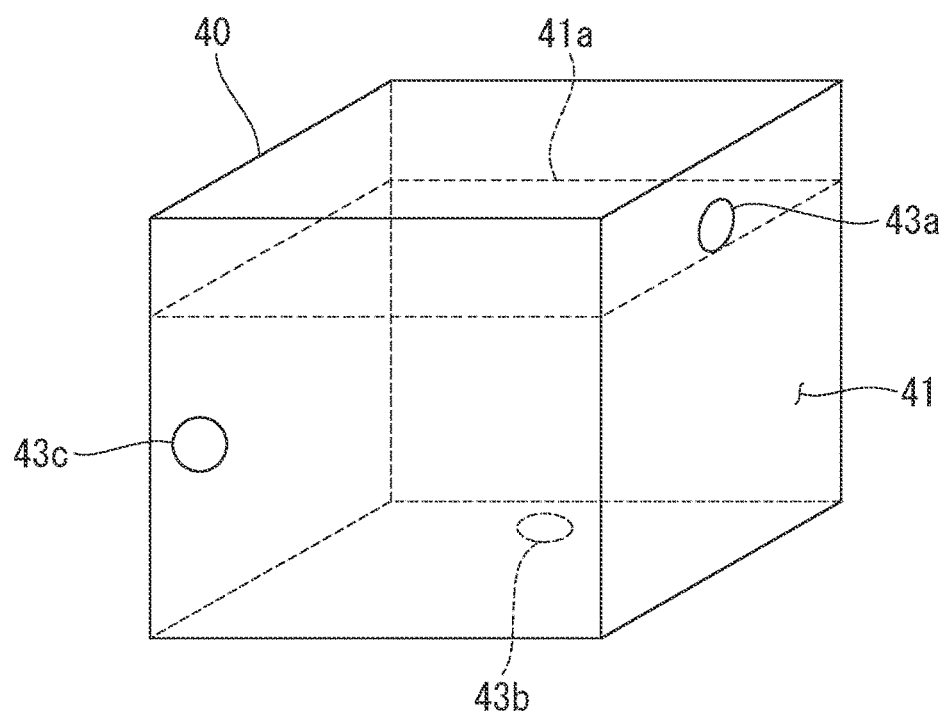
FIG. 6 is a schematic diagram showing a first modification of the lubricant chamber in FIG. 3.
Figure 7:
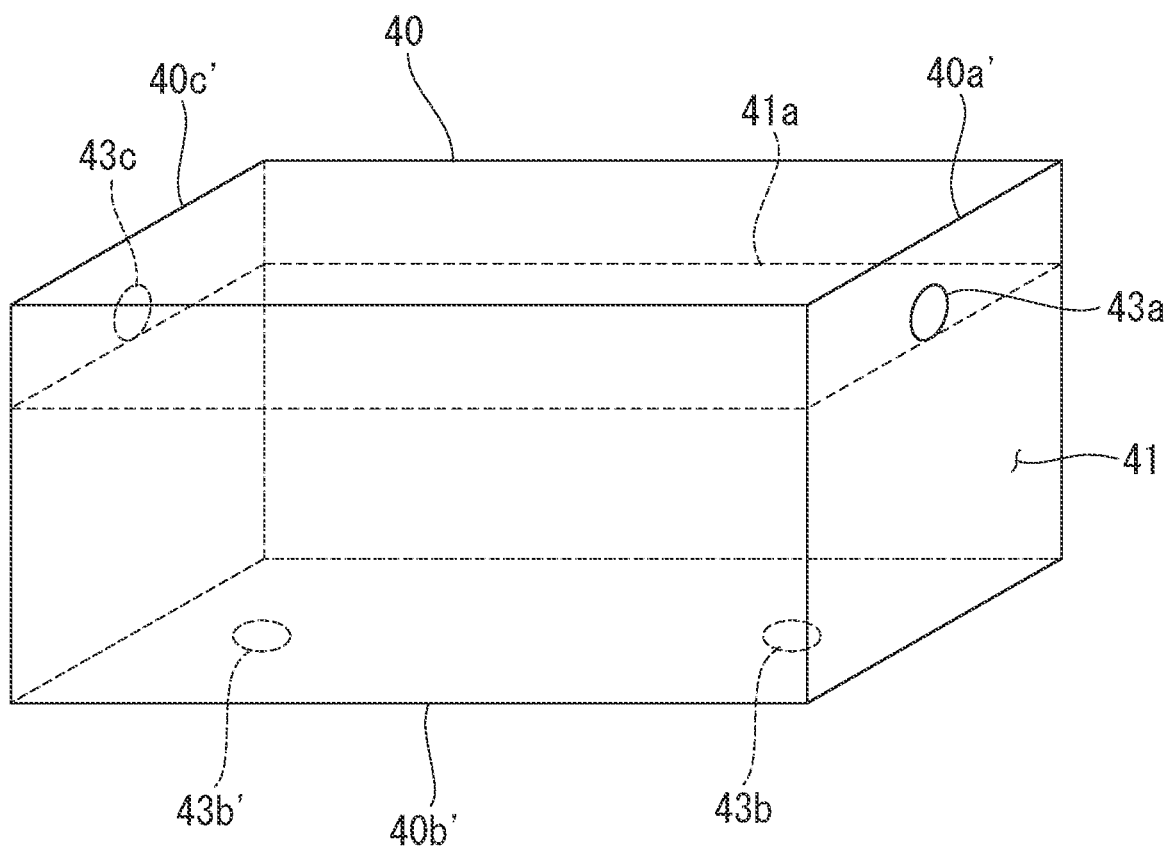
FIG. 7 is a schematic diagram showing a second modification of the lubricant chamber in FIG. 3.

In addition, in this embodiment, the lubricant chamber 40 has a substantially columnar shape; however, alternatively, a substantially cuboidal shape, as shown in FIGS. 6 and 7, or other arbitrary shapes may be employed.

In the example shown in FIG. 6, the through-holes 43a, 43b, and 43c are provided, one each, in the three faces of the lubricant chamber 40 that are orthogonal to each other. In addition, in the case in which one of the individual through-holes 43a, 43b, and 43c is disposed at the lowest level, at least one of the remaining through-holes is disposed at the position corresponding to the liquid level 41a when the required amount of the lubricant 41 is stored in the lubricant chamber 40.

In addition, in the example shown in FIG. 7, of a pair of side wall surfaces 40a' and 40c' that are parallel to each other, the side wall surface 40a' is provided with the through-hole 43a and the side wall surface 40c' is provided with the through-hole 43c, and a side wall surface (bottom surface) 40b' disposed between the side wall surfaces 40a' and 40c' so as to be orthogonal thereto is provided with the through-hole 43b and a through-hole 43b'.

In the orientation in which the through-hole 43c is disposed at the lowest level of the lubricant chamber 40, the through-hole 43b is disposed at the position corresponding to the liquid level 41a when the required amount of the lubricant 41 is stored in the lubricant chamber 40. In addition, in the orientation in which the through-hole 43a is disposed at the lowest level of the lubricant chamber 40, the through-hole 43b' is disposed at the position corresponding to the liquid level 41a when the required amount of the lubricant 41 is stored in the lubricant chamber 40.

Accordingly, between the case in which the through-hole 43a is utilized as the oil discharge hole and the case in which the through-hole 43c is utilized as the oil discharge hole, it is possible to employ different through-holes as the vent hole, and it is possible to increase the degree of freedom of the arrangements of the through-holes 43b and 43b' set in the side wall surface 40b'.

In addition, in this embodiment, in the respective orientations of the lubricant chamber 40 in which one of the through-holes 43a, 43b, and 43c is disposed at the lowest level, the required amounts of the lubricant 41 stored in the lubricant chamber 40 may be different from each other.

In this case, the required amounts of the lubricant 41 stored in the lubricant chamber 40 may be respectively set, in accordance with the orientations of the lubricant chamber 40, to be amounts with which it is possible to sufficiently lubricate the gears 11 in the lubricant chamber 40, the bearing 12, and the decelerator 20.

In addition, this embodiment has been described in terms of the joint A that rotates the second arm 5 with respect to the first arm 4 as an example; however, the same structure may be applied to other joints. In particular, it is preferable that the same structure be applied to each axis of the wrist unit 6 that is capable of taking various orientations.

Figure 8:
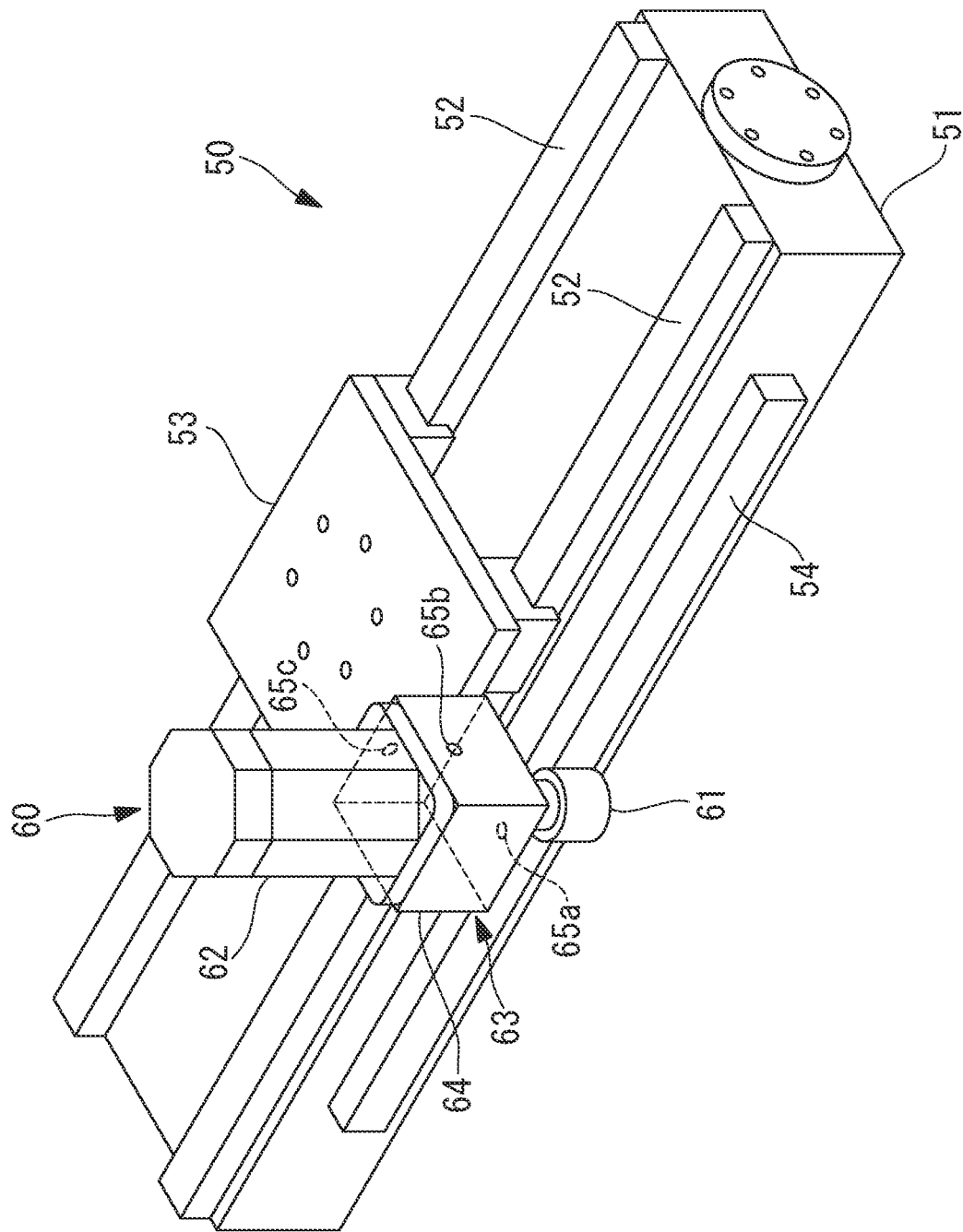
FIG. 8 is an overall configuration diagram showing a modification of the robot in FIG. 1.

In addition, in this embodiment, a vertical articulated robot has been described as an example of the robot 1; however, alternatively, the present invention may be applied to a tool (robot) 50, as shown in FIG. 8, that is attached to a distal end of the wrist unit 6 of the robot 1.

In the example shown in FIG. 8, the tool 50 includes: a cuboid base 51; a pair of guide rails 52 secured to the base 51; a slider 53 supported so as to be movable along the guide rails 52; and a driving mechanism 60 that drives the slider 53. The slider 53 is attached to the distal end of the wrist unit 6 of the robot 1 in a detachable manner.

The driving mechanism 60 includes: a rack gear 54 secured to the base 51; a pinion gear 61 that engages with the rack gear 54; a servomotor 62 that generates a driving force; and a decelerator 63 that decelerates the rotation of the servomotor 62 and transmits the rotation to the pinion gear 61.

The servomotor 62 is secured to a cuboid housing 64 that forms a lubricant chamber (not shown), and a decelerating mechanism of the decelerator 63 is accommodated in the lubricant chamber in the housing 64.

The housing 64 is provided with through-holes 65a, 65b, and 65c that allow the lubricant chamber in the housing 64 to communicate with the external space, and the respective through-holes 65a, 65b, and 65c are disposed at positions at which the respective through-holes can be utilized as one of the oil supply hole, the oil discharge hole, and the vent hole in accordance with the orientation of the tool 50.

For example, in the case in which the tool 50 is in the orientation in FIG. 8, the through-hole 65a disposed at the lowest level of the housing 64 is utilized as the oil discharge hole, one of the remaining through-holes 65b and 65c is utilized as the vent hole, and the other through-hole is utilized as the oil supply hole. Accordingly, it is possible to perform the work for replacing a lubricant (not shown) in the lubricant chamber.

Figure 9:
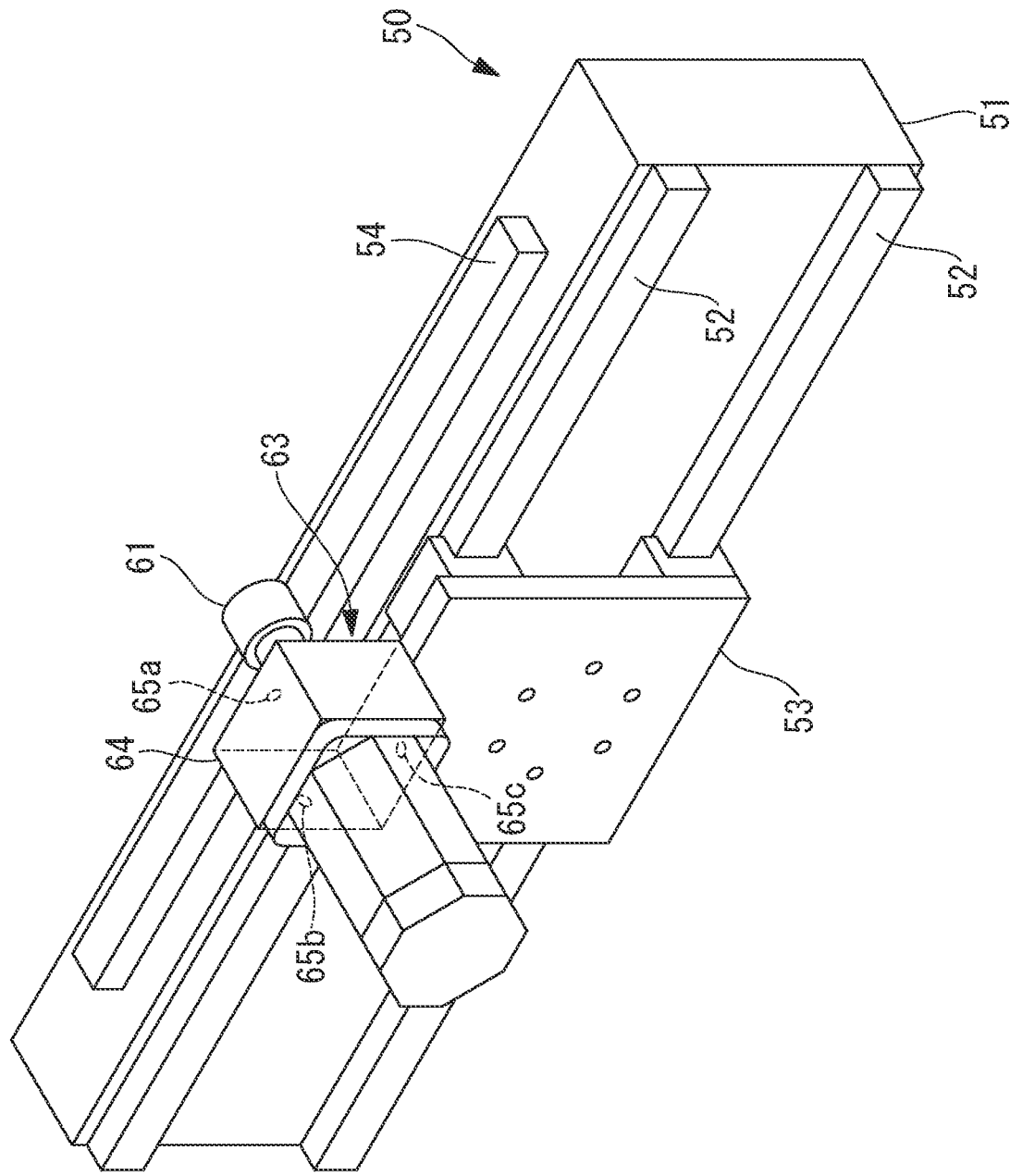
FIG. 9 is an overall configuration diagram in the case in which the robot in FIG. 8 is disposed in a different orientation from the orientation in FIG. 8.

In addition, in the case in which the tool 50 is in the orientation shown in FIG. 9, the through-hole 65c is disposed at the lowest level of the housing 64; therefore, the through-hole 65c may be utilized as the oil discharge hole, the through-hole 65a may be utilized as the vent hole, and the through-hole 65b may be utilized as the oil supply hole. Accordingly, it is possible to easily perform the work for replacing the lubricant, even if the tool 50 is disposed in different orientations, such as the state in which the tool 50 is attached to the wrist unit 6 of the robot 1 and the state in which the tool 50 is removed from the wrist unit 6 and accommodated in an accommodation site.

Figure 10:
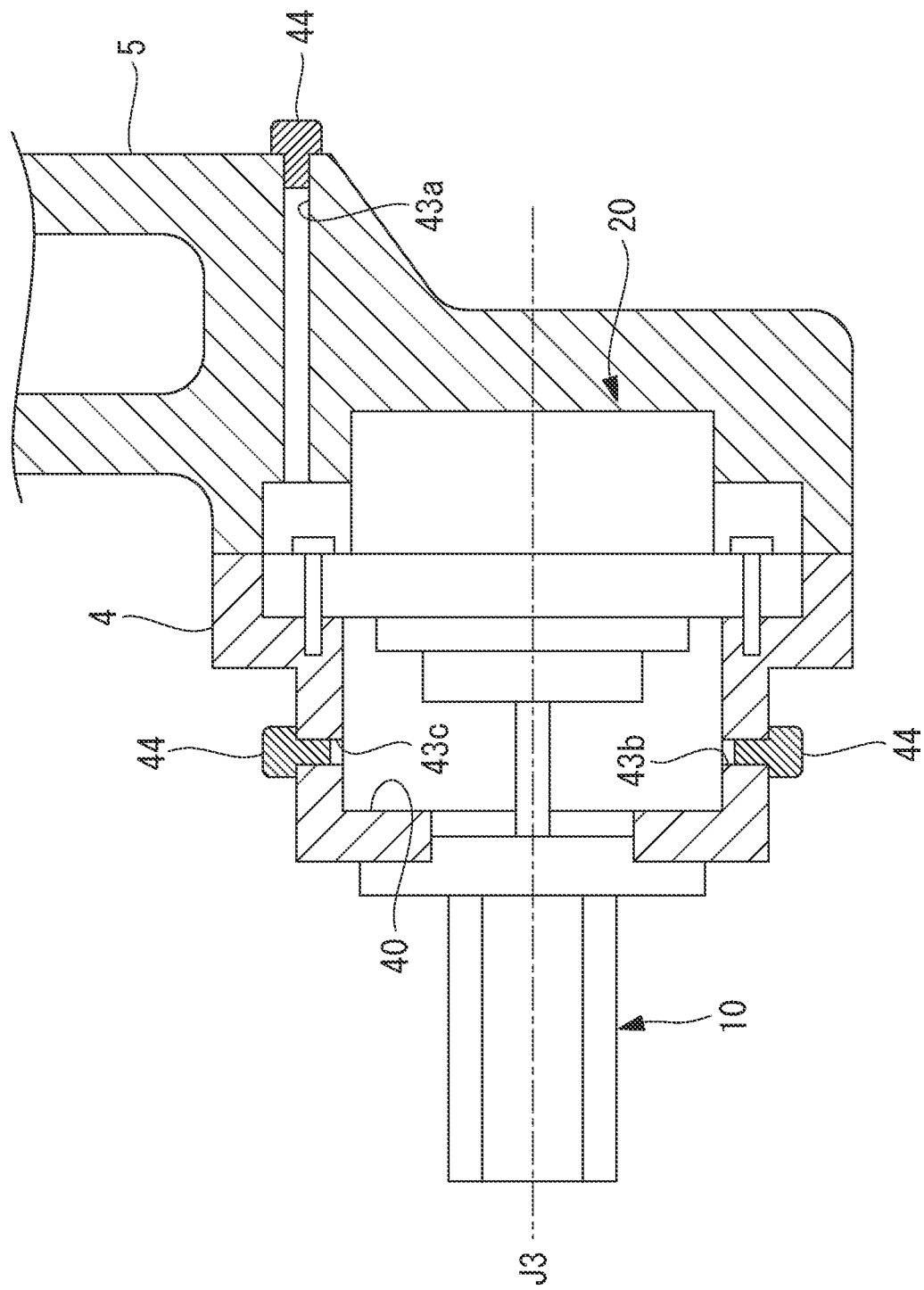
FIG. 10 is a schematic longitudinal sectional view showing a modification of the joint in FIG. 2.

In addition, in this embodiment, the lubricant chamber 40 is provided in the first arm 4; however, alternatively, the lubricant chamber 40 may be provided so as to bridge across the first arm 4 and the second arm 5, as shown in FIG. 10.

Figure 11:
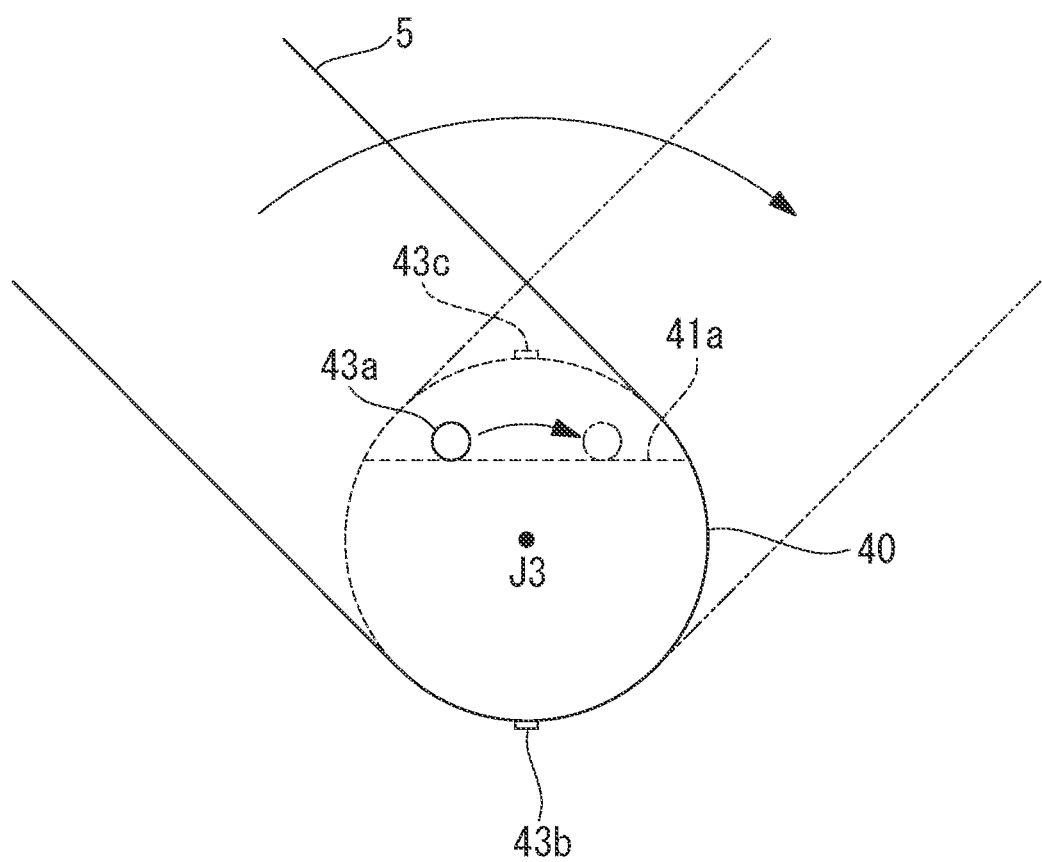
FIG. 11 is a schematic diagram showing the relationship between the orientation of an arm and individual through-holes in the joint in FIG. 10.

In FIG. 10, the through-holes 43b and 43c are provided on the first arm 4 side, and the through-hole 43a is provided on the second arm 5 side. Accordingly, as shown in FIG. 11, in the case in which the orientation of the second arm 5 with respect to the first arm 4 is changed about the third axis J3 by 90°, the through-holes 43b and 43c are not moved and only the through-hole 43a is moved. In addition, the through-hole 43a is disposed at the position corresponding to the liquid level 41a when the required amount of the lubricant 41 is stored in the lubricant chamber 40 both before and after the movement.

Therefore, it is possible to appropriately perform the work for replacing the lubricant 41 with respect to a plurality of different orientations of the lubricant chamber 40 even in the case in which the orientation of the lubricant chamber 40 changes as a result of a portion defining the lubricant chamber 40 being moved.

In addition, in this embodiment, the through-hole 43b that is disposed at the position at which the through-hole 43b can be utilized as the oil supply hole is provided in addition to the through-hole 43a that can be utilized as the oil discharge hole and the through-hole 43c that can be utilized as the vent hole. Alternatively, the through-hole 43a that can be utilized as the oil discharge hole may be utilized as the oil supply hole by attaching a nipple provided with a check valve to the through-hole 43a after discharging the oil. In this case, the number of the through-holes 43a and 43c provided in the lubricant chamber 40 may be two or greater.

The invention claimed is:

1. A robot comprising a lubricant chamber in which a fluid lubricant can be stored, wherein
   the lubricant chamber is provided with three or more through-holes that extend through wall surfaces of the lubricant chamber, and
   the through-holes are disposed such that, in a state in which any one of the through-holes is disposed at a lowest level of the lubricant chamber so as to allow a utilization thereof as an oil discharge hole in two or more orientations of the lubricant chamber, another one of the through-holes is disposed at a position corresponding to a liquid level of the lubricant when a required amount of the lubricant is stored in the lubricant chamber so as to allow a utilization thereof as a vent hole, and a remaining one of the through-holes is disposed at a position that allows a utilization thereof as an oil supply hole from which the lubricant is supplied into the lubricant chamber.

2. The robot according to claim 1, wherein
the lubricant chamber is configured by being surrounded by a first member and a second member that is supported with respect to the first member so as to be rotatable about a horizontal rotation axis,
   the first member is provided with any one of the through-holes that serves as the oil discharge hole, and
   the second member is provided with another one of the through-holes that serves as the vent hole.

3. A robot
comprising a lubricant chamber in which a fluid lubricant can be stored, wherein
   the lubricant chamber is provided with three or more through-holes that extend through wall surfaces of the lubricant chamber,
   the through-holes are disposed such that, in a state in which any one of the through-holes is disposed at a lowest level of the lubricant chamber so as to allow a utilization thereof as an oil discharge hole in two or more orientations of the lubricant chamber, another one of the through-holes is disposed at a position corresponding to a liquid level of the lubricant when a required amount of the lubricant is stored in the lubricant chamber or above the liquid level so as to allow a utilization thereof as a vent hole, and a remaining one of the through-holes is disposed at a position that allows a utilization thereof as an oil supply hole from which the lubricant is supplied into the lubricant chamber,
   each of the through-holes can be utilized as any of the oil discharge hole, the oil supply hole, and the vent hole,
   in a case in which the lubricant chamber is disposed in an orientation in which any one of the through-holes is disposed at the lowest level of the lubricant chamber and utilized as the oil discharge hole,
   another one of the through-holes is disposed at a position that allows a utilization thereof as the oil supply hole, and
   a remaining one of the through-holes is disposed at a position that allows a utilization thereof as the vent hole.

4. The robot according to claim 3, wherein
   the lubricant chamber includes a pair of side wall surfaces that are parallel to each other and a bottom surface that is orthogonal to the side wall surfaces,
   one or more of the through-holes are formed in the pair of side wall surfaces, and
   two or more of the through-holes are formed in the bottom surface.

5. The robot according to claim 3, wherein the other one of the through-holes is disposed above the remaining one of the through-holes.

6. A robot comprising a lubricant chamber in which a fluid lubricant can be stored, wherein
   the lubricant chamber is provided with two or more through-holes that extend through wall surfaces of the lubricant chamber, and
   the through-holes are disposed such that, in a state in which any one of the through-holes is disposed at a lowest level of the lubricant chamber so as to allow a utilization thereof as an oil discharge hole in two or more orientations of the lubricant chamber, another one of the through-holes is disposed at a position corresponding to a liquid level of the lubricant when a required amount of the lubricant is stored in the lubricant chamber so as to allow a utilization thereof as a vent hole.

* * * * *